United States Patent
Tajima

(10) Patent No.: US 10,963,763 B2
(45) Date of Patent: Mar. 30, 2021

(54) THERMAL PRINTER

(71) Applicant: Mitsubishi Electric Corporation, Tokyo (JP)

(72) Inventor: Toshihisa Tajima, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/770,810

(22) PCT Filed: Jul. 25, 2019

(86) PCT No.: PCT/JP2019/029235
§ 371 (c)(1),
(2) Date: Jun. 8, 2020

(65) Prior Publication Data
US 2021/0027125 A1    Jan. 28, 2021

(51) Int. Cl.
*G06K 15/00* (2006.01)
*G06K 15/02* (2006.01)

(52) U.S. Cl.
CPC ....... *G06K 15/4065* (2013.01); *G06K 15/028* (2013.01); *G06K 15/1823* (2013.01); *G06K 15/4055* (2013.01)

(58) Field of Classification Search
None
See application file for complete search history.

(56) References Cited

U.S. PATENT DOCUMENTS

| 5,747,413 A * | 5/1998 | Amano | B41M 5/363 |
| | | | 503/201 |
| 2007/0232489 A1* | 10/2007 | Tatewaki | B41M 5/305 |
| | | | 503/201 |

(Continued)

FOREIGN PATENT DOCUMENTS

| JP | 5-63934 A | 3/1993 |
| JP | 05063935 A * | 3/1993 |

(Continued)

OTHER PUBLICATIONS

International Search Report issued in PCT/JP2019/029235, dated Oct. 8, 2019.

*Primary Examiner* — Dung D Tran
(74) *Attorney, Agent, or Firm* — Birch, Stewart, Kolasch & Birch, LLP

(57) ABSTRACT

It is an object of the present invention to provide a technique capable of suppressing power consumption when printing an image with high density in a thermal printer. the recording paper contains a reversible thermochromic recording material which is in a color-developed state in an initial state, starts color reduction at $T_1$ or higher after the start of rising temperature, and turns into an achromatized state at $T_2$ or higher which is higher than $T_1$. A thermal printer includes the input unit that receives image data, the image processing unit that converts the density for each pixel of the image data into heating data based on the density and temperature characteristics of the reversible thermochromic recording material, and the print processing unit that makes the thermal head heat the recording paper for each pixel based on the heating data to form an image on the recording paper.

1 Claim, 8 Drawing Sheets

(56) References Cited

U.S. PATENT DOCUMENTS

| | | | | |
|---|---|---|---|---|
| 2008/0153698 A1* | 6/2008 | Kawahara | ................ | B41M 5/26 |
| | | | | 503/201 |
| 2008/0214391 A1* | 9/2008 | Kawahara | ................ | B41J 2/442 |
| | | | | 503/201 |
| 2015/0080214 A1* | 3/2015 | Yamamoto | ......... | G06K 15/1228 |
| | | | | 503/201 |
| 2015/0350477 A1 | 12/2015 | Takeda et al. | | |

FOREIGN PATENT DOCUMENTS

| JP | 6-270434 A | 9/1994 |
|---|---|---|
| JP | 9-58036 A | 3/1997 |
| JP | 2006-15726 A | 1/2006 |

\* cited by examiner

F I G. 5
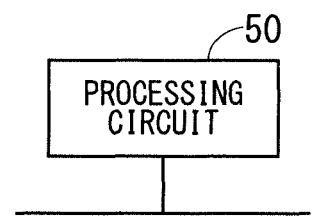
F I G. 6
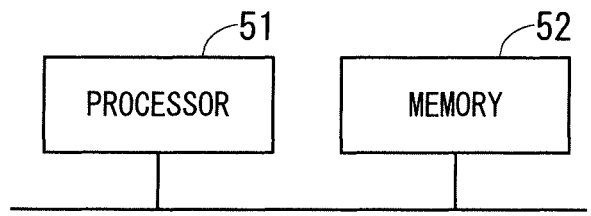

THERMAL PRINTER

TECHNICAL FIELD

The present invention relates to a thermal printer that performs printing on recording paper using a thermal head, and to recording paper.

BACKGROUND ART

A thermal printer using a thermal head adopts a thermosensitive system in which recording paper containing an irreversible thermochromic recording material that develops color when heated is used, and the color develops gradually from white to black with the heat applied by the thermal head (for example, see Patent Document 1).

The thermal printer of the thermosensitive system is incorporated into a medical diagnostic device such as an ultrasonic diagnostic device, for example, and almost all the image data to be printed is black, and an image of an organ or the like is formed in white or gray on the black background. Therefore, when printing, even higher heat is necessary to be applied in order to generate a deeper color.

PRIOR ART DOCUMENTS

Patent Documents

[Patent Document 1] Japanese Patent Application Laid-Open No. 9-058036

SUMMARY

Problem to be Solved by the Invention

The thermal printer of the thermal system described in Patent Document 1 has a problem in that, when a black image is printed in particular, a large amount of power is required for heat generation in order to generate a high-density color, thereby increasing power consumption.

Therefore, an object of the present invention is to provide a technique that can suppress the power consumption when printing an image with high density in a thermal printer.

Means to Solve the Problem

According to the present invention, a thermal printer is configured to perform printing by pressing and heating recording paper by a thermal head and a platen roller, in which the recording paper contains a reversible thermochromic recording material which is in a color-developing state in an initial state, starts color reduction at a first temperature or higher after start of rising temperature, and turns into an achromatized state at a second temperature or higher which is higher than the first temperature, the recording paper includes a first recording paper containing the reversible thermochromic recording material and a second recording paper containing an irreversible thermochromic recording material which is in an achromatized state in an initial state, starts color development at a third temperature or higher after start of rising temperature, and turns into a color-developed state at a fourth temperature or higher which is higher than the third temperature, the thermal printer includes an input unit configured to receive image data, an image processing unit configured to convert density for each pixel of the image data into heating data based on density and temperature characteristics of the reversible thermochromic recording material, a print processing unit configured to make the thermal head heat the recording paper for each pixel based on the heating data to form an image on the recording paper, and a recording paper switching unit configured to selectively switch the recording paper on which printing is performed between the first recording paper and the second recording paper. The image processing unit is configured to calculate an average density for each pixel of the image data and, when the average density is greater than a predetermined density, convert the density for each pixel of the image data into heating data based on the density and temperature characteristics of the reversible thermochromic recording material, and, when the average density is equal to or lower than the predetermined density, convert the density for each pixel of the image data into heating data based on the density and temperature characteristics of the irreversible thermochromic recording material. The recording paper switching unit is configured to select the first recording paper when the average density is greater than the predetermined density, and select the second recording paper when the average density is equal to or lower than the predetermined density.

Effects of the Invention

According to the present invention, when printing an image with a high density, the amount of color reduction is reduced, and the amount of heat applied to the reversible thermochromic recording material contained in the recording paper can be suppressed: therefore, the power consumption of the thermal printer can be reduced.

These and other objects, features, aspects and advantages of the present invention will become more apparent from the following detailed description of the present invention when taken in conjunction with the accompanying drawings.

BRIEF DESCRIPTION OF DRAWINGS

FIG. 5 A diagram illustrating an example of a hardware configuration of an image processing unit and a print processing unit included in the thermal printer according to Embodiment 1.

FIG. 6 A diagram illustrating an example of a hardware configuration of an image processing unit and a print processing unit included in the thermal printer according to Embodiment 1.

DESCRIPTION OF EMBODIMENTS

Embodiment 1

Hereinafter, Embodiment 1 of the present invention is described with reference to the drawings.

<Configuration>

Figure 1:
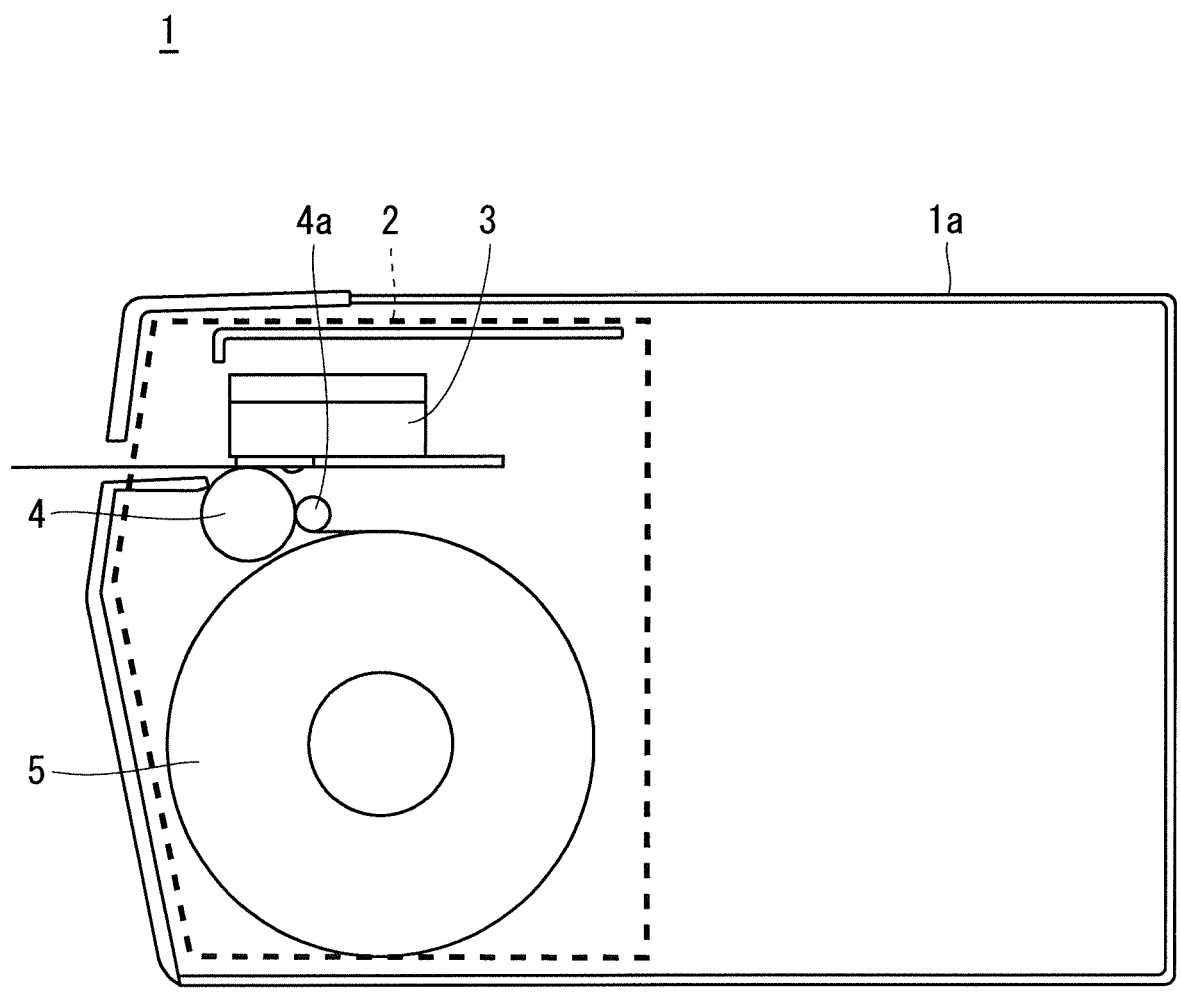
FIG. 1 A side view illustrating an internal structure of a thermal printer according to Embodiment 1.
Figure 2:
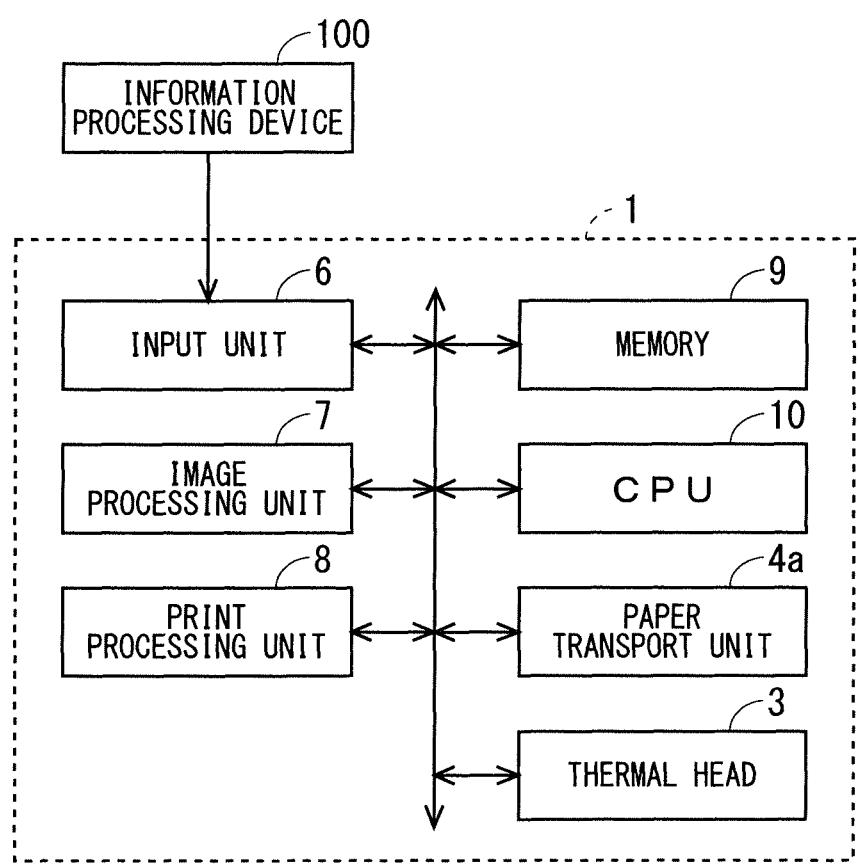
FIG. 2 A block diagram of the thermal printer according to Embodiment 1.

FIG. 1 is a side view illustrating an internal structure of a thermal printer 1 according to Embodiment 1. FIG. 2 is a block diagram of the thermal printer 1.

As illustrated in FIGS. 1 and 2, the thermal printer 1 includes a thermal head 3, a platen roller 4, an input unit 6, an image processing unit 7, a print processing unit 8, a paper transport unit 4a, a memory 9, and a CPU 10.

The thermal head 3 heats recording paper 5 loaded on a printing mechanism 2 described later. The platen roller 4 is arranged below the thermal head 3 and presses and transports the recording paper 5 with the thermal head 3. The input unit 6 receives image data transmitted from an external information processing device 100 connected to the thermal head 3. The image processing unit 7 processes and converts the image data into heating data. The print processing unit 8 makes the thermal head 3 heat the recording paper 5 based on the heating data. The details of the image processing unit 7 and the print processing unit 8 will be described later.

The paper transport unit 4a is arranged on the back side of the platen roller 4 so as to face the platen roller 4, and transports the recording paper 5 towards the upstream or downstream side of the transport path. The memory 9 includes a temporary storage memory such as a RAM for temporarily storing image data received by the input unit 6, and a non-volatile memory for storing a control program, initial setting values, and the like. A density-temperature conversion table described later is stored in the memory 9. The CPU 10 controls the printing mechanism 2 according to the control program stored in the memory 9 to perform printing. It should be noted that, sensors, structural supports, display units, and the like that are not directly related to the description of the operation of Embodiments are omitted in the drawings.

As illustrated in FIG. 1, the printing mechanism 2 is arranged inside a housing 1a, and includes the thermal head 3, the platen roller 4, and the paper transport unit 4a. The recording paper 5 containing a reversible thermochromic recording material is loaded on the printing mechanism 2 in a state of being wound in a roll shape.

Figure 3:
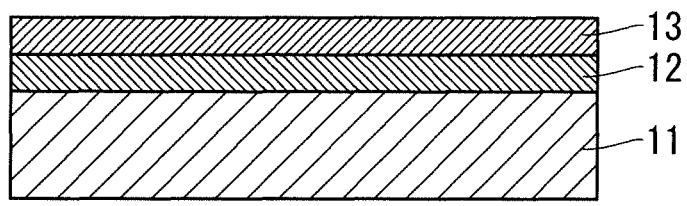
FIG. 3 A cross-sectional view of recording paper for the thermal printer according to Embodiment 1.

Next, the recording paper 5 containing the reversible thermochromic recording material will be described. FIG. 3 is a cross-sectional view of the recording paper 5. FIG. 3 schematically illustrates the structure of the recording paper 5, which is, in a strict sense, different from the actual size and shape.

As illustrated in FIG. 3, the recording paper 5 includes a support substrate 11, a recording layer 12, and a protective layer 13. The recording layer 12 is formed on the upper surface of the support substrate 11. The recording layer 12 is formed by applying reversible thermochromic microcapsule pigment, which is the reversible thermochromic recording material. The reversible thermochromic recording material is in a color-developing state in an initial state, starts color reduction at a first temperature or higher after the start of rising temperature, and turns into an achromatized state at a second temperature or higher which is higher than the first temperature. The protective layer 13 is formed on the upper surface of the recording layer 12.

<Operation>

Next, the printing operation of the thermal printer 1 will be described. The image data transmitted from the information processing device 100 to the thermal printer 1 is received by the input unit 6 and stored in the memory 9. The image data stored in the memory 9 is converted, by the image processing unit 7, into heating data based on a density-temperature conversion table stored in the memory 9 in advance. Specifically, after converting the image data into printing data corresponding to density information for each pixel, the image processing unit 7 converts the printing data into heating data corresponding to temperature information for each pixel to be heated based on the density-temperature conversion table.

Figure 4:
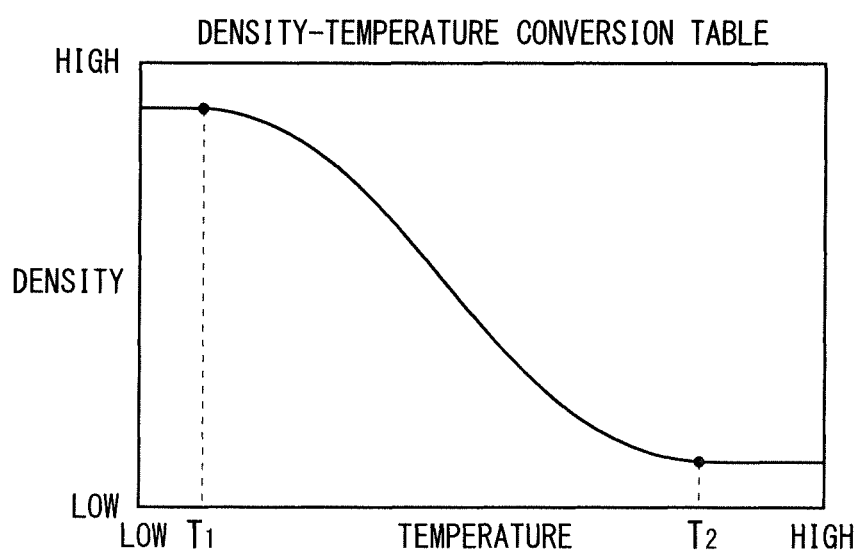
FIG. 4 A density-temperature conversion table stored in a memory of the thermal printer according to Embodiment 1.

Here, the density-temperature conversion table will be described with reference to FIG. 4. FIG. 4 is a density-temperature conversion table stored in the memory 9, and specifically, is a graph illustrating the relationship between the heating temperature and the density for the reversible thermochromic recording material.

As illustrated in FIG. 4, the reversible thermochromic recording material is in a color-developed state (black) in an initial state, and starts color reduction at $T_1$ or higher after the start of rising temperature. The color becomes an achromatized state (white) at $T_2$ or higher, which is higher than $T_1$. Here, $T_1$ corresponds to the first temperature, and $T_2$ corresponds to the second temperature.

Back to the description of the operation of the thermal printer 1, the print processing unit 8 makes the thermal head 3 heat the recording paper 5 to a predetermined temperature for each pixel based on the heating data. At this time, the recording paper 5 is transported by the paper transport unit 4a with the recording paper 5 being pressed by the thermal head 3 and the platen roller 4, and the printing is performed. The reversible thermochromic recording material contained in the recording paper 5 is heated by each pixel and color reduction occurs for each pixel to form an image.

Next, hardware configurations of the image processing unit 7 and the print processing unit 8 will be described. FIGS. 5 and 6 are diagrams illustrating examples of hardware configurations of the image processing unit 7 and the print processing unit 8.

The image processing unit 7 and the print processing unit 8 are realized by, for example, a processing circuit 50 illustrated in FIG. 5. That is, the processing circuit 50 converts the density for each pixel of the image data into heating data based on the density and temperature characteristics of the reversible thermochromic recording material, and causes the thermal head 3 to heat the recording paper 5 for each pixel based on the heating data to form an image on the recording paper 5.

A dedicated hardware may be applied to the processing circuit 50, and a processor (a Central Processing Unit (CPU), a processing unit, an arithmetic unit, a microprocessor, a microcomputer, and Digital Signal Processor (DSP)) executing a program stored in a memory may also be applied to the processing circuit 50.

When dedicated hardware is applied to the processing circuit 50, a single circuit, a composite circuit, a programmed processor, a parallel programmed processor, an Application Specific Integrated Circuit (ASIC), a Field Programmable Gate Array (FPGA), and combinations thereof correspond to the processing circuit 50. Each of the image processing unit 7 and the printing processing unit 8 may be realized by a plurality of processing circuits, or may be realized by a single processing circuit with the functions integrated.

FIG. 6 illustrates a hardware configuration of the image processing unit 7 and the print processing unit 8 when the processing circuit 50 is configured with a processor. In this case, the functions of the image processing unit 7 and the print processing unit 8 are realized by a combination of software or the like (software, firmware or software and firmware). The software and so forth are written as programs and stored in a memory 52. A processor 51 that is applied to the processing circuit 50, reads and runs the programs stored in a memory 52, thereby each of the functions is realized. That is, the image processing unit 7 and the printing processing unit 8 includes the memory 52 for storing the program to consequently execute, by the processing circuit 50, processing for converting the density for each pixel of the image data into heating data based on the density and temperature characteristics of the reversible thermochromic recording material, and processing for making the thermal head 3 heat the recording paper 5 for each pixel based on the heating data to form an image on the recording paper 5. In other words, the program causes a computer to execute procedures and methods of the operations of the image processing unit 7 and the print processing unit 8.

Here, a nonvolatile or volatile semiconductor memory such as a Random Access Memory (RAM), a Read Only Memory (ROM), a flash memory, an Erasable Programmable Read Only Memory (EPROM), an Electrically Erasable Programmable Read Only Memory (EEPROM), and a Hard Disk Drive (HDD), a magnetic disk, a flexible disk, an optical disk, a compact disk, a minidisk, Digital Versatile Disc (DVD), and a drive device therefor and any storage media used in the future may be used.

The configuration in which each function of the image processing unit 7 and the print processing unit 8 are realized by one of hardware and software and so forth is described so far. However, the configuration is not limited thereto, and the configuration in which one of the image processing unit 7 and the print processing unit 8 is realized by the dedicated hardware, while the other is realized by the software and so forth, may be applicable. For example, for one of the image processing unit 7 and the print processing unit 8, the function is realized by a processing circuit 50 as dedicated hardware, and for the other, the processing circuit 50, as a processor 51, reads out and executes a program stored in a memory 52 to realize the function.

As described above, the image processing unit 7 and the print processing unit 8 are capable of realizing each function described above by hardware, software and so forth, and a combination thereof.

<Effects>

As described above, in the thermal printer 1 according to Embodiment 1, the recording paper 5 contains the reversible thermochromic recording material which is in a color-developed state in an initial state, starts color reduction at $T_1$ or higher after the start of rising temperature, and turns into an achromatized state at $T_2$ or higher which is higher than $T_1$, and the thermal printer 1 includes the input unit 6 that receives the image data, the image processing unit 7 that converts the density for each pixel of the image data into heating data based on the density and temperature characteristics of the reversible thermochromic recording material, and the print processing unit 8 that makes the thermal head 3 heat the recording paper 5 for each pixel based on the heating data to form an image on the recording paper 5.

Therefore, when printing an image with a high density, the amount of color reduction is reduced, and the amount of heat applied to the reversible thermochromic recording material contained in the recording paper 5 can be suppressed: therefore, the power consumption of the thermal printer 1 can be reduced.

Further, suppression of the power consumption of the thermal printer 1 can reduce the size of the power source of the thermal printer 1; therefore, the thermal printer 1 can be downsized.

Embodiment 2

Figure 7:
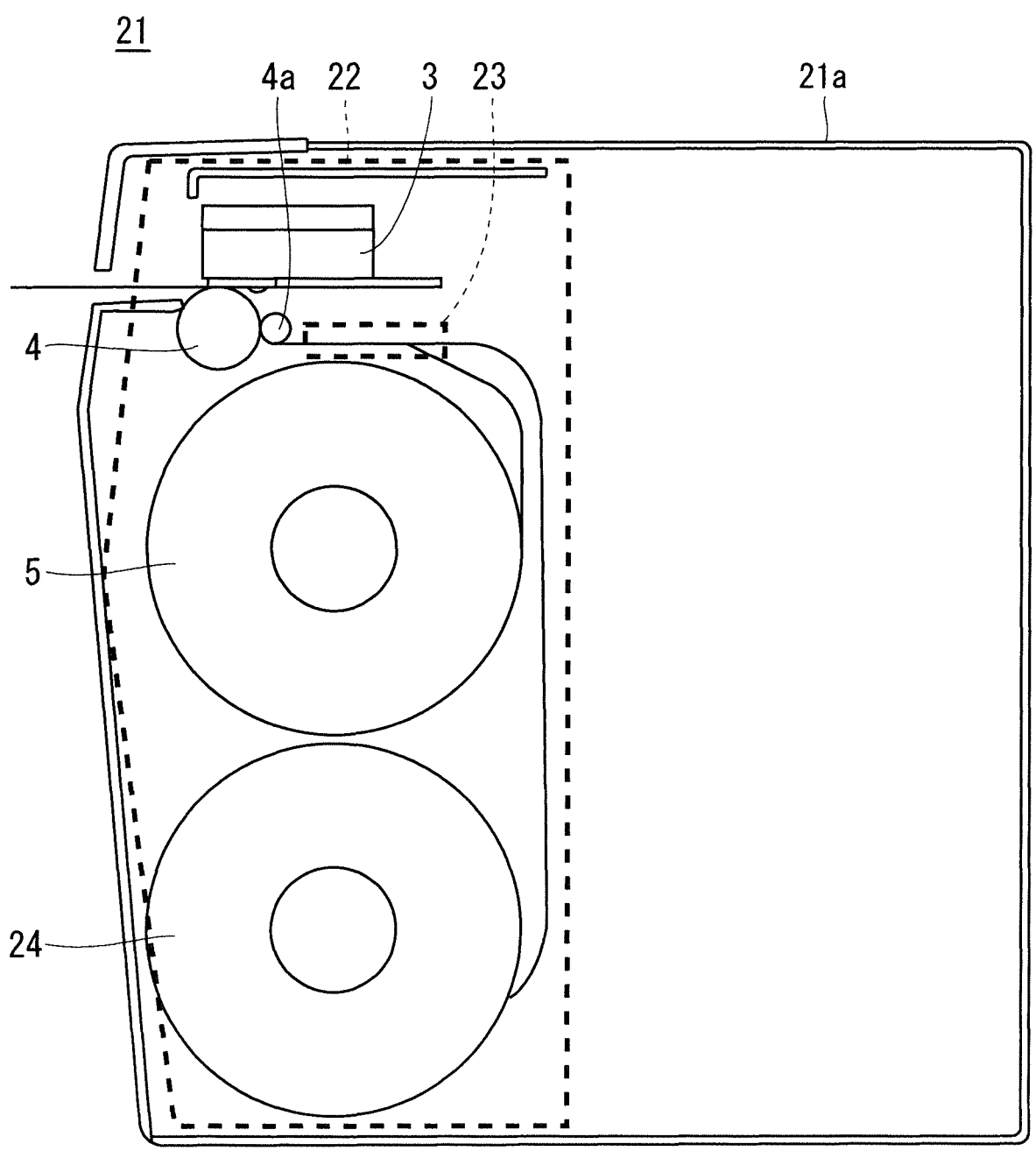
FIG. 7 A side view illustrating an internal structure of a thermal printer according to Embodiment 2.
Figure 8:
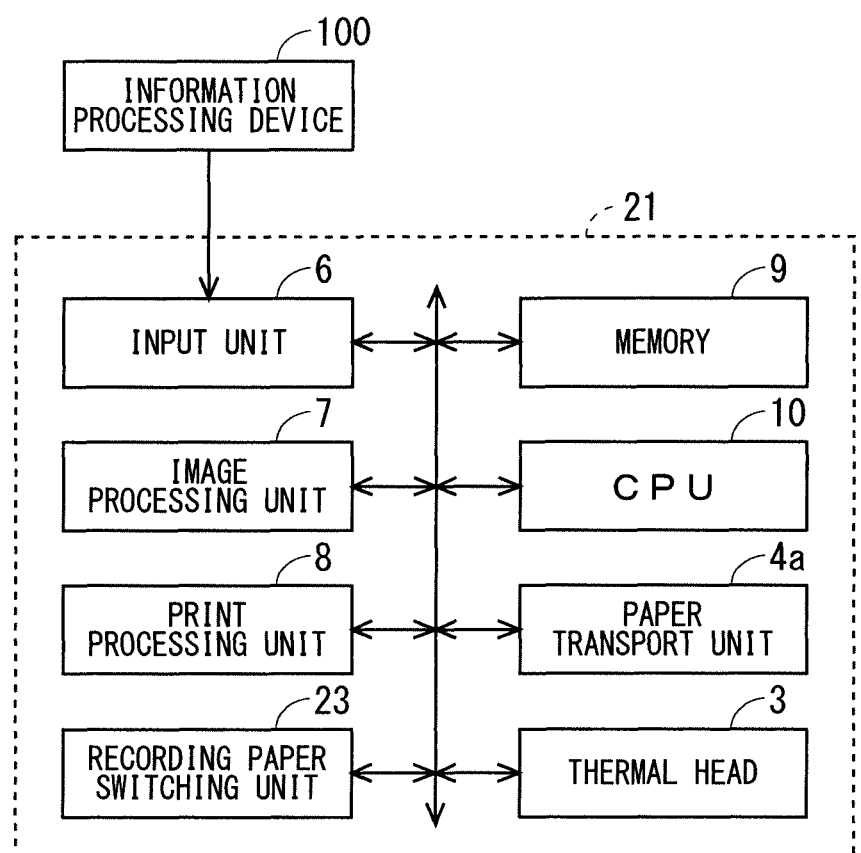
FIG. 8 A block diagram of the thermal printer according to Embodiment 2.

Next, the thermal printer according to Embodiment 2 will be described. FIG. 7 is a side view illustrating an internal structure of a thermal printer 21. FIG. 8 is a block diagram of the thermal printer 21. In Embodiment 2, the same components as those described in Embodiment 1 are denoted by the same reference numerals, and description thereof will be omitted.

In Embodiment 1, although the printing was performed using only the recording paper 5 containing the reversible thermochromic recording material, in Embodiment 2, as illustrated in FIG. 7, the printing is performed by selecting one of the recording paper 5 containing the reversible thermochromic recording material and the recording paper 24 containing the irreversible thermochromic recording material.

As illustrated in FIGS. 7 and 8, the thermal printer 21 includes a thermal head 3, a platen roller 4, an input unit 6, an image processing unit 7, a print processing unit 8, a paper transport unit 4a, a recording paper switching unit 23, a memory 9, and a CPU 10. The CPU 10 controls the printing mechanism 22 according to the control program stored in the memory 9 to perform printing. A density-temperature conversion table of the reversible thermochromic recording material and a density-temperature conversion table of the irreversible thermochromic recording material are stored in the memory 9.

The printing mechanism 22 is arranged inside a housing 21a, and includes the thermal head 3, the platen roller 4, the paper transport unit 4a, and the recording paper switching unit 23. The printing mechanism 22 is loaded with the recording paper 5 containing the reversible thermochromic recording material on the upper side and the recording paper 24 containing the irreversible thermochromic recording material on the lower side, and both of which are in a state of being wound in a roll shape.

The recording paper switching unit 23 is arranged on the upstream side of the transport path of the recording paper 5 and the recording paper 24 with respect to the paper transport unit 4a, and selectively switches the recording paper on which printing is performed between the recording paper 5 and the recording paper 24. Here, the recording paper 5 corresponds to first recording paper containing a reversible thermochromic recording material, and the recording paper 24 corresponds to second recording paper containing an irreversible thermochromic recording material.

The recording paper 24 includes a support substrate, a recording layer, and a protective layer, as is the same with the recording paper 5 illustrated in FIG. 3, and the support substrate and the protective layer are the same as the recording paper. The recording layer is formed by applying irreversible thermochromic microcapsule pigment, which is the irreversible thermochromic recording material. The irreversible thermochromic recording material is in an achromatized state (white) in an initial state, starts color development at a third temperature or higher after the start of rising temperature, and turns into a color-developed state (black) at a fourth temperature or higher which is higher than the third temperature.

Figure 9:
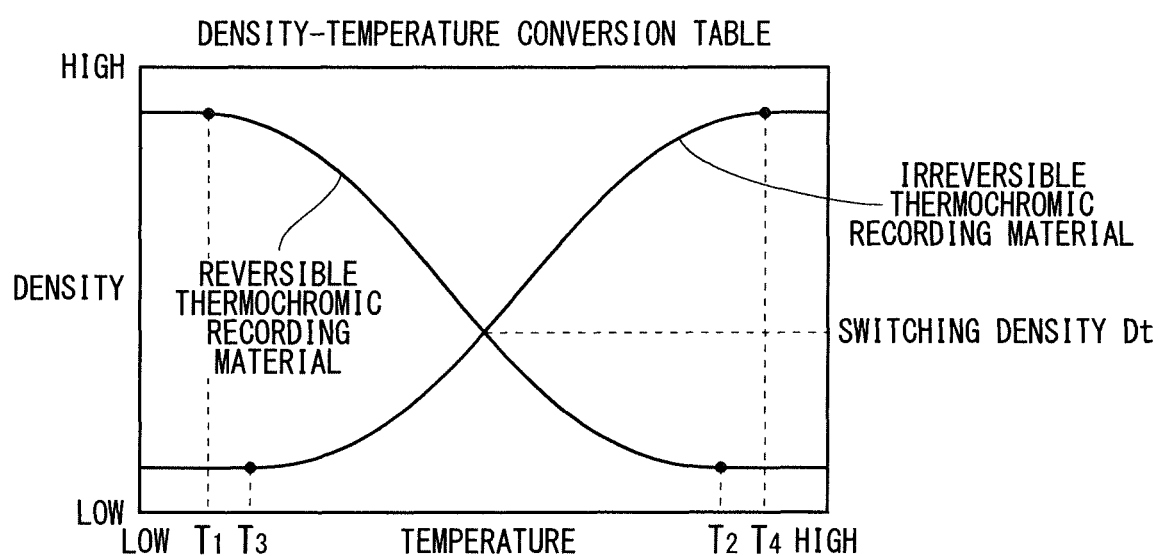
FIG. 9 A density-temperature conversion table stored in a memory of the thermal printer according to Embodiment 2.

The density-temperature conversion table will be described with reference to FIG. 9. FIG. 9 is a density-temperature conversion table stored in the memory 9, and specifically, is a graph illustrating the relationship between the heating temperature and the density for the reversible thermochromic recording material and the relationship between the heating temperature and the density for the irreversible thermochromic recording material.

As illustrated in FIG. 9, the irreversible thermochromic recording material is in an achromatized state (white) in an initial state, and starts color development at $T_3$ or higher after the start of rising temperature. And, the color becomes a color-developed state (black) at $T_4$ or higher, which is higher than $T_3$. Here, $T_3$ corresponds to a third temperature, and $T_4$ corresponds to a fourth temperature. It should be noted that, the reversible thermochromic recording material is the same as the one described with reference to FIG. 4, and the description thereof is omitted.

Figure 10:
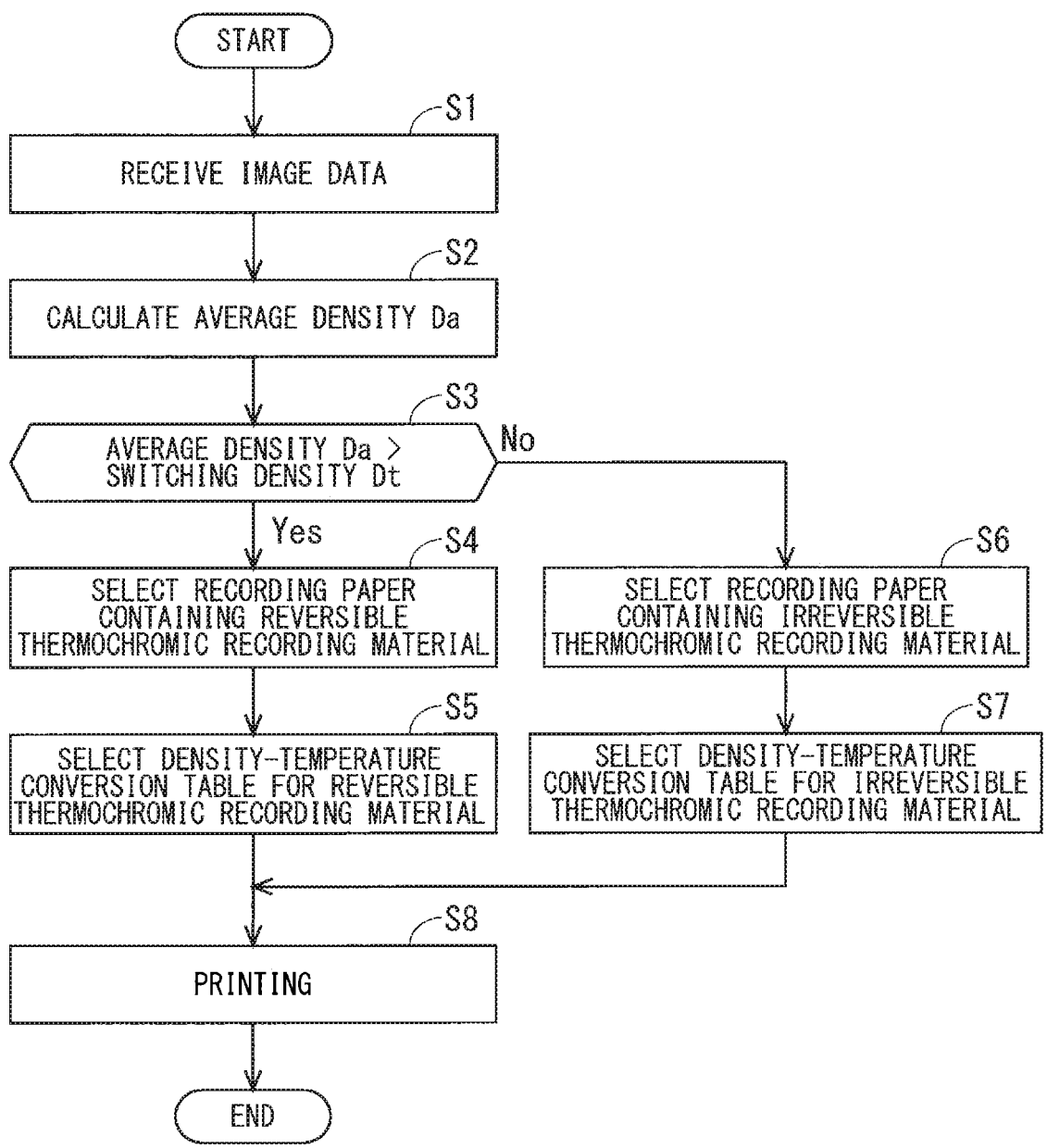
FIG. 10 A flowchart illustrating the printing operation of the thermal printer according to Embodiment 2.

Next, the printing operation of the thermal printer 21 will be described. FIG. 10 is a flowchart of the printing operation of the thermal printer 21.

As illustrated in FIG. 10, the image data transmitted from the information processing device 100 to the thermal printer 21 is received by the input unit 6, and is stored in the memory 9 (Step S1). Next, the image processing unit 7 calculates the average density Da of all the pixels of the image data stored in the memory 9 (Step S2), and compares the calculated average density Da to the preset switching density Dt (Step S3).

When the average density Da is greater than the switching density Dt (Yes in Step S3), the image data stored in the memory 9 is high-density image data; therefore, the recording paper switching unit 23 selects the recording paper 5 containing the reversible thermochromic recording material as the recording paper to be printed (Step S4).

The image processing unit 7 selects a density-temperature conversion table for the reversible thermochromic recording material stored previously in the memory 9 (Step S5). The image processing unit 7 converts the image data into printing data corresponding to density information for each pixel, and converts the printing data into heating data corresponding to temperature information for each pixel to be heated based on the selected density-temperature conversion table.

The print processing unit 8 makes the thermal head 3 heat the recording paper 5 to a predetermined temperature for each pixel based on the heating data. At this time, the recording paper 5 is transported by the paper transport unit 4a with the recording paper 5 being pressed by the thermal head 3 and the platen roller 4, and the printing is performed. The reversible thermochromic recording material contained in the recording paper 5 is heated by each pixel and color reduction occurs for each pixel to form an image (Step S8).

Meanwhile, when the average density Da is equal to or lower than the switching density Dt (No in Step S3), the image data stored in the memory 9 is low-density image data; therefore, the recording paper switching unit 23 selects the recording paper 24 containing the irreversible thermochromic recording material as the recording paper to be printed (Step S6).

The image processing unit 7 selects a density-temperature conversion table for the irreversible thermochromic recording material stored previously in the memory 9 (Step S7). The image processing unit 7 converts the image data into printing data corresponding to density information for each pixel, and converts the printing data into heating data corresponding to temperature information for each pixel to be heated based on the selected density-temperature conversion table.

The print processing unit 8 makes the thermal head 3 heat the recording paper 24 to a predetermined temperature for each pixel based on the heating data. At this time, the recording paper 24 is transported by the paper transport unit 4a with the recording paper 24 being pressed by the thermal head 3 and the platen roller 4, and the printing is performed. The irreversible thermochromic recording material contained in the recording paper 24 is heated by each pixel and color development occurs for each pixel to form an image (Step S8).

In FIG. 7, although the recording paper 5 containing the reversible thermochromic recording material is arranged on the upper side, and the recording paper 24 containing the irreversible thermochromic recording material is arranged on the lower side, the recording paper 5 containing the reversible thermochromic recording material may be arranged on the lower side and the recording paper 24 containing the irreversible thermochromic recording material may be arranged on the upper side. Further, the arrangement position can be changed as appropriate, for example, the recording paper 5 is arranged on the front side and the recording paper 24 is arranged on the rear side, or the recording paper 5 is arranged on the rear side and the recording paper 24 is arranged on the front side.

As described above, in the thermal printer 21 according to Embodiment 2, the recording paper includes the recording paper 5 containing the reversible thermochromic recording material, and the recording paper 24 containing the irreversible thermochromic recording material which is in an achromatized state in an initial state, starts color development at $T_3$ or higher after the start of rising temperature, and turns into a color-developed state at $T_4$ or higher which is higher than $T_3$, the thermal printer 21 further includes the recording paper switching unit 23 that selectively switches the recording paper on which printing is performed between the recording paper 5 and the recording paper 24, the image processing unit 7 calculates the average density Da for each pixel of the image data and, when the average density Da is greater than the switching density Dt, converts the density for each pixel of the image data into heating data based on the density and temperature characteristics of the reversible thermochromic recording material, and, when the average density Da is equal to or lower than the switching density Dt, converts the density for each pixel of the image data into heating data based on the density and temperature characteristics of the irreversible thermochromic recording material, and the recording paper switching unit 23 selects the recording paper 5 when the average density Da is greater than the switching density Dt, and selects the recording paper 24 when the average density is equal to or lower than the switching density Dt.

Therefore, recording paper with a small amount of heat required for the thermal head 3 can be selected based on the average density Da of the image data, so that even when printing image data of various densities, power consumption of the thermal printer 21 can be suppressed.

Further, suppression of the power consumption of the thermal printer 21 can reduce the size of the power source of the thermal printer 21; therefore, the thermal printer 21 can be downsized.

While the invention has been described in detail, the foregoing description is in all aspects illustrative and not restrictive. It is understood that numerous other modifications and variations can be devised without departing from the scope of the invention.

It should be noted that Embodiments of the present invention can be arbitrarily combined and can be appropriately modified or omitted without departing from the scope of the invention.

EXPLANATION OF REFERENCE SIGNS 1 thermal printer, 3 thermal head, 4 platen roller, 5 recording paper, 6 input unit, 7 image processing unit, 8 print processing unit, 21 thermal printer, 23 recording paper switching unit, 24 recording paper.

The invention claimed is:

1. A thermal printer configured to perform printing by pressing and heating recording paper by a thermal head and a platen roller, wherein the recording paper contains a reversible thermochromic recording material which is in a color-developing state in an initial state, starts color reduction at a first temperature or higher after start of rising temperature, and turns into an achromatized state at a second temperature or higher which is higher than the first temperature, the recording paper includes a first recording paper containing the reversible thermochromic recording material and a second recording paper containing an irreversible thermochromic recording material which is in an achromatized state in an initial state, starts color development at a third temperature or higher after start of rising temperature, and turns into a color-developed state at a fourth temperature or higher which is higher than the third temperature, the thermal printer includes an input unit configured to receive image data, an image processing unit configured to convert density for each pixel of the image data into heating data based on density and temperature characteristics of the reversible thermochromic recording material, a print processing unit configured to make the thermal head heat the recording paper for each pixel based on the heating data to form an image on the recording paper, and a recording paper switching unit configured to selectively switch the recording paper on which printing is performed between the first recording paper and the second recording paper, the image processing unit is configured to calculate an average density for each pixel of the image data and, when the average density is greater than a predetermined density, convert the density for each pixel of the image data into heating data based on the density and temperature characteristics of the reversible thermochromic recording material, and, when the average density is equal to or lower than the predetermined density, convert the density for each pixel of the image data into heating data based on the density and temperature characteristics of the irreversible thermochromic recording material, and the recording paper switching unit is configured to select the first recording paper when the average density is greater than the predetermined density, and select the second recording paper when the average density is equal to or lower than the predetermined density.

* * * * *